INVENTOR.
HOWARD N. WIELAND
BY
ATTORNEYS

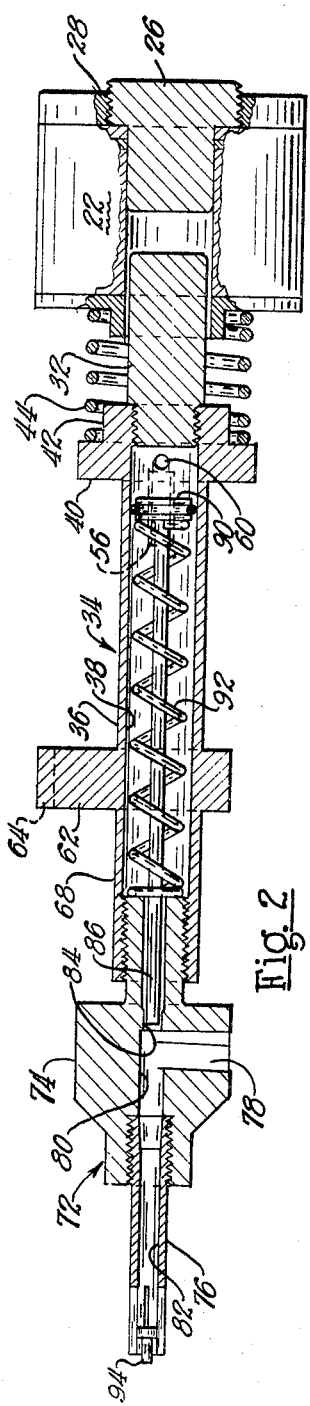
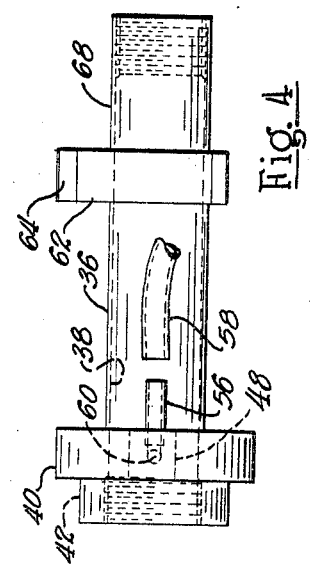
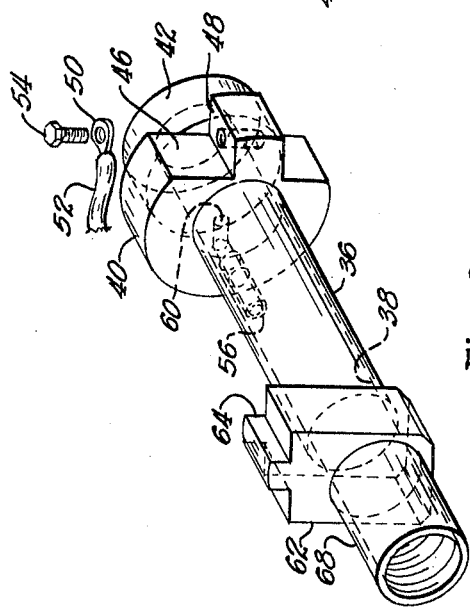
INVENTOR.
HOWARD N. WIELAND
BY
ATTORNEYS

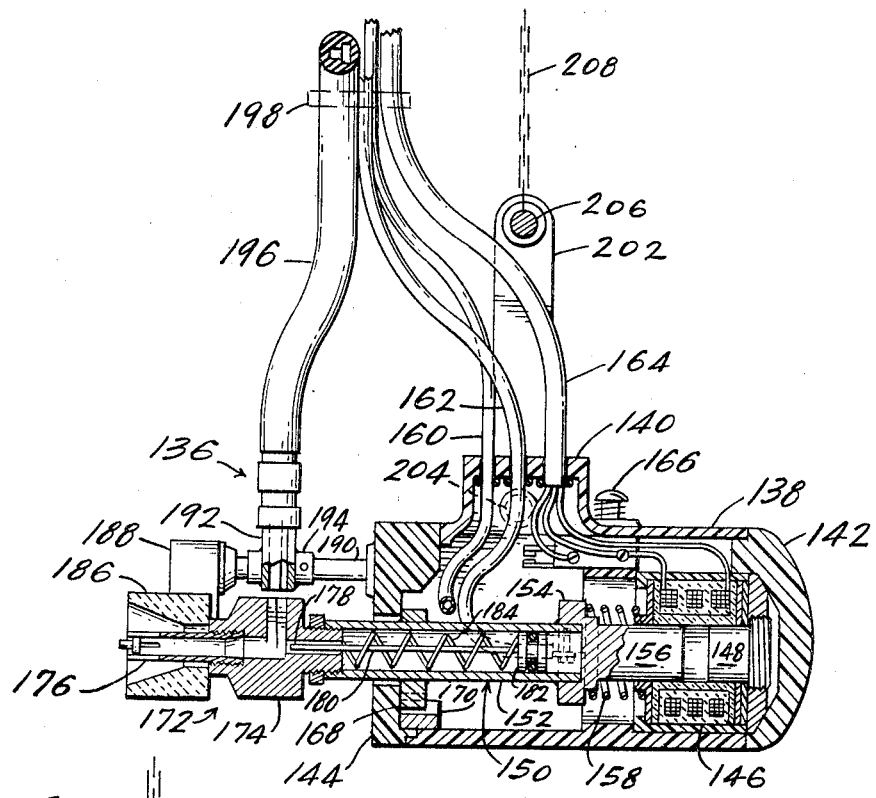
Fig. 5.
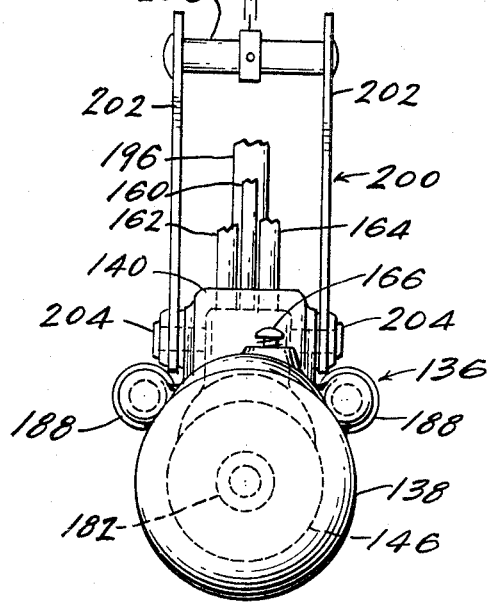
Fig. 6.
INVENTOR:
HOWARD N. WIELAND.
BY
ATTORNEYS.

United States Patent Office 3,489,878
Patented Jan. 13, 1970

3,489,878
COMPACT PORTABLE STUD WELDING TOOL
Howard N. Wieland, Amherst, Ohio, assignor to Gregory Industries, Inc., Lorain, Ohio, a corporation of Michigan
Filed Apr. 29, 1965, Ser. No. 451,832
Int. Cl. B23k 9/20, 11/04, 11/26
U.S. Cl. 219—98                                                        15 Claims

ABSTRACT OF THE DISCLOSURE

A stud welding tool receives the studs automatically and feeds them to a welding chuck of the tool. The tool has an internal air cylinder for operating a plunger to feed the studs to the chuck and back up the studs during welding with the air cylinder being located within the tool so that the overall tool is substantially no larger than conventional stud welding tools heretofore employed in which the studs were loaded into the chuck by hand. The air cylinder also can be combined with a core of the tool which cooperates with a solenoid coil to retract the chuck and stud from the workpiece, and also combined with an electrical cable connection through which welding power is supplied to the chuck.

---

This invention relates to a stud welding tool and more particularly to a compact stud welding tool having means for receiving, positioning, and holding welding studs fed thereto.

Stud welding tools for end welding various types of studs to workpieces are now in common use and are being used more and more in rapid production operations. In the operation of this type of tool, the loading of the studs often can be excessively time consuming, particularly when the studs are small. They must first be grasped by the operator, oriented to a predetermined position, aligned with the welding tool which is to hold the stud during welding, and finally inserted into and positioned in the chuck. Especially where large numbers of studs are to be welded at a relatively high rate, the time involved in feeding the studs to the chuck by hand can be so excessive as to make the production operation impractical.

Accordingly, loading devices have heretofore been proposed for feeding studs automatically to a stud welding tool, thereby greatly increasing the rate of loading of studs into the chuck of the tool. Such tools, however, have been relatively cumbersome, excessively long, and hard to manipulate. In accordance with the present invention, a welding tool is provided with internal elements to aid in the positioning and holding of automatically-fed studs. Toward this end, an internal component located within the body of the welding tool provides a connection for a welding cable, constitutes a core for a lifting coil, and forms a cylinder containing a piston and plunger means for moving, positioning and holding studs during a welding operation. Means are also connected to the rear of the component for supplying power fluid behind the piston to drive the stud plunger. The internal component preferably extends toward the forward end of the welding tool body to receive a chuck adapter forming a loading chamber, with the adapter being connected directly to the welding chuck. A pair of legs can be used to support a spark shield around the welding chuck and, in this instance, the legs also can be used to support a supply tube through which the studs are automatically and sequentially fed to an inlet of the chuck adapter. The studs are then fed through the loading chamber and into the chuck by a stud plunger at the forward end of the piston rod to which the plunger is connected. The plunger not only moves the studs through the loading passage and positions them in the end of the chuck, but also holds the studs in position in the chuck during a welding operation. With this arrangement, the chuck itself does not extend appreciably any further forwardly of the main welding tool body than conventional chucks heretofore known in the art. This not only enables the tool to be compact but also provides a better balance for the tool.

The present invention also provides a welding tool which is particularly adapted for use in production lines where an operator manipulates the tool over a relatively long period of time, such as an entire work shift. For this use, the tool can be suspended from an overhead support at least partially to reduce the effective weight thereof. All of the various connections to the tool, including electrical lines and cables and stud supply lines, can then extend upwardly from the top of the tool along with the suspension means, to provide minimum obstruction. The tool also can be equipped with a manually-operated switch located behind the suspension means and to the rear of the lines and cables.

It is, therefore, a principal object of the invention to provide an improved stud welding tool to which studs can be fed sequentially, which tool is substantially the same size as conventional welding tools.

Still another object of the invention is to provide a stud welding tool to which studs are fed automatically, which tool is substantially as easy to use and handle as conventional stud welding tools heretofore known.

A further object of the invention is to provide a stud welding tool especially designed for production lines, which tool can be suspended from an overhead support with the lines and cables of the tool extending upwardly therefrom.

Other objects and advantages of the invention will be apparent from the following detailed description of preferred embodiments thereof, reference being made to the accompanying drawings, in which:

FIG. 2 is an enlarged view in vertical, longitudinal cross section of some of the internal elements shown in FIG. 1;

FIG. 3 is a view in perspective of an internal component of the welding tool of FIG. 1;

FIG. 4 is a left side view in elevation of the component of FIG. 3;

FIG. 5 is a view in longitudinal, vertical cross section of a slightly modified welding tool embodying the invention; and FIG. 6 is a rear end view of the tool of FIG. 5.

Figure 1:
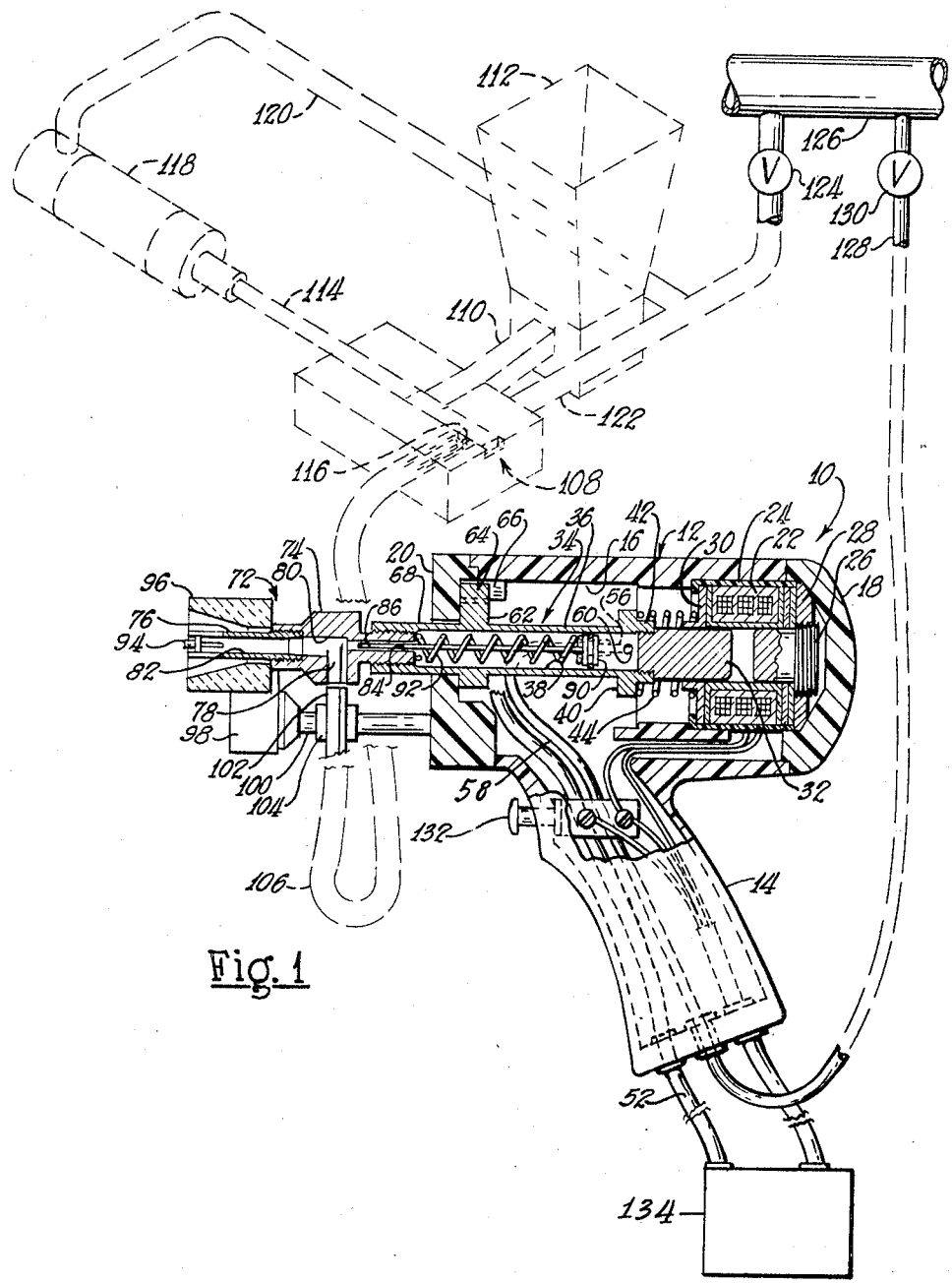
FIG. 1 is a view partly in perspective and partly in vertical cross section of a loading system and a welding tool embodying the invention.

The tools shown in the drawings are preferably designed to be used to weld studs by an arc welding technique as disclosed in Nelson Patent 2,191,494 or in Glorioso Patent 3,163,880. However, the basic tools also can be used with a welding technique as disclosed in Graham Patent 2,610,278, for example, or by resistance welding.

Referring particularly to FIG. 1, a welding tool 10 includes a body 12 and an integral handle 14. The body 12 forms a main chamber 16 closed at the rear end by an insulating cap 18 and at the forward end by a front wall 20.

An electrical lifting coil 22 is located in an insulating sleeve 24 at a rear portion of the chamber 16. A fixed core or stop 26 extends into the coil 22 a predetermined distance and is held by an end plate 28. At the forward end of the lifting coil 22 is a guide plate 30 which receives a movable core 32 attached to a movable internal welding component 34. The component 34 includes an intermediate cylinder or cylindrical wall 36 forming a piston chamber 38 (FIG. 2) and has a rear flange 40, beyond which extends a cylindrical projection 42 which threadedly receives the movable core 32. One end of a main plunge spring 44 is located around the projection 42 and is seated against the flange 40. The other end of plunge spring 44 seats against the guide plate 30.

The flange 40 has a notch 46 therein with a horizontal, generally radially extending surface 48 to which a terminal 50 (FIG. 1) of a welding cable 52 is affixed by a threaded fastener 54. This connection enables the welding cable 52 to extend forwardly, parallel to the component 34, and then to curve downwardly in a U-shape configuration, and finally straighten out and extend through the handle 14. With this arrangement, the U-shape portion of the cable 52 easily accommodates the reciprocating motion of the component 34 without causing deterioration of the cable and eventual failure thereof. In addition, there is no tendency for the terminal 50 to work loose with respect to the flange 40 as might otherwise occur with, by way of example, the terminal connected by a threaded fastener to the vertical surface of the notch 46.

The rear flange 40 of the component 34 also includes, on the side opposite the notch 46, a tube connection or nipple 56 (FIG. 4) which extends forwardly from the flange parallel to the longitudinal extent of the component 34. A flexible air or other power fluid supply line 58 is connected to the nipple 56 and, because of the positioning of the nipple, the air line 58 also has a first portion extending forwardly parallel to the longitudinal extent of the component 34, a portion of which curves downwardly in a U-shape configuration, and finally a third portion which straightens out and extends through the handle 14. The flexible line 58 thereby assumes a configuration similar to that of the welding cable 52 and easily flexes with the motion of the component 34. As shown in FIGS. 2 and 3, an air passage 60 connects the nipple 56 with the back end of the cylinder 38.

The internal component 34 of the tool 10 also has a front flange or enlargement 62 at the forward end of the cylinder wall 36. The enlargement 62 has an upwardly extending projection 64 which is received in a groove 66 of the front wall 20. The cooperation of the groove and projection prevents rotation of the component 34 relative to the tool 10. Extending forwardly of the enlargement 62 is a forward projection 68 which preferably extends somewhat beyond an opening 70 in the front wall 20. The projection 68 receives chuck means or chuck assembly 72 which specifically comprises a chuck adapter 74 and a chuck 76, the adapter 74 being threadedly connected to the projection 68 in this instance. The adapter 74 has an inlet 78 communicating with a loading passage 80 which, in turn, is aligned with a chuck passage 82. The adapter 74 also has a rear guide passage 84 which receives a stud plunger 86 and a portion of a piston rod 88 connected to a piston 90 in the cylinder chamber 38. The piston 90 normally is retained in a retracted position by a spring 92 but when air is supplied to the chamber 38 through the line 58, and the force of the spring 92 is overcome, the piston moves forwardly to cause the plunger 86 to move a stud 94 in the loading passage 80 forwardly to a welding position at the end of the chuck passage 82 where the plunger holds the stud 94 in position until it is welded to a workpiece. A spark shield 96 surrounds the stud 94 during the welding thereof, as is known in the art, with the shield 96 being supported by a holder 98 connected to a pair of supporting legs 100 extending parallel to the component 34 from a lower portion of the tool body.

The studs can be fed sequentially to the inlet 78 from a rigid supply tube 102 aligned with the inlet 78 and supported by a bracket 104 attached to the supporting legs 100. The studs supplied to the tube 102 can be fed from a magazine, a hopper, or other suitable sources. As shown, the studs are fed by air through a flexible supply line 106 from an escapement mechanism 108 to which the studs are fed down an inclined track 110 from a hopper 112. A carrier 114 moves the studs one at a time from the track 110 into alignment with an air passage 116 when operated by a pneumatic ram 118. The stud is then blown down the flexible tube 106 to the loading chamber 80 at which time it is moved forwardly to the welding position by the plunger 86 and the piston 90.

The air to operate the ram 118 and to blow the stud down the flexible tube can be supplied through lines 120 and 122, controlled by a valve 124, and supplied from a suitable source 126. The air to operate the piston 90 can be supplied through a line 128 controlled by a valve 130, with the valve 130 closing to retract the plunger 86 by means of the spring 92 only after the valve 124 opens. This sequence causes the stud blown through the tube 106 to contact the piston rod 88 and then to move a short distance into the chamber 80 after the piston 90 is retracted when the valve 130 is subsequently closed. The stud cannot readily bounce and become cocked in the chamber 80 as can otherwise occur if blown directly thereinto. After an instant, the valve 130 is again opened to cause the stud to be moved to the welding position.

With the stud 94 in position in the chuck 76, the tool is moved toward a workpiece until the stud 94 engages the workpiece, at which time the stud may move backward slightly relative to the spark shield 96 until the forward edge of the spark shield 96 rests against the workpiece. The chuck means 72, the internal component 34, and the movable core 32 then move rearwardly slightly in the tool. When a trigger 132 is pressed, the coil 22 is energized by means of a power source and control circuitry designated 134, to cause the movable core 32 to retract against the fixed stop 26. This movement retracts the component 34 and the chuck means 72 a like distance to cause the stud to retract the same distance from the workpiece, the spark shield 96 remaining against the workpiece.

Substantially at the same time that the stud is retracted, a pilot arc is established between the stud and the workpiece by relatively low voltage applied between the stud and the workpiece with the aid of an electrical path set up through the welding cable 52, the flange 40, the cylinder wall 36, and the chuck means 72. The pilot arc is drawn as the stud retracts and after the stud has reached the retracted position for a predetermined period, a main welding arc is established by increased power supplied through the welding cable 52. After the main welding arc has persisted for a predetermined period of time, the power to the coil 22 is cut off and the plunge spring 44 then causes the flange 40 and the component 34 to plunge the stud against the workpiece to complete the weld. Some variation may occur in the timing and sequencing of the above-described steps but are immaterial from the standpoint of the present invention.

From the above, it will be seen that the unique internal component 34 combines the cable clamp function and the stud feeding and holding function inside the welding tool. The component 34 thus enables the overall stud welding tool 10 to be substantially no longer than conventional welding tools known in the art. Further, the balance of the tool is maintained since there are no extra components overhanging the front of the tool. The tool is also less subject to damage because of the minimum number of external and protruding elements.

In many instances, as when the tool is to be used to weld studs to products on an assembly line, the tool can be suspended from an overhead support. This greatly reduces operator fatigue, especially when the tool is used for an entire work shift. In such an instance, it has been found to be particularly advantageous to provide the tool with means to receive the electrical cables and conductors, the air line, the stud supply line from overhead. Referring to FIGS. 5 and 6, a welding tool 136 has a body 138 with an integral, upwardly-extending projection 140 to receive electrical and air lines. The body 138 has no handle with the operator grasping the body so as to manipulate it in a variety of positions. The body 138 has an end cap 142 and a front wall 144 to provide a completely enclosed chamber. The tool also includes a lifting coil 146 at a rear portion of the chamber and a stop 148 therein.

An internal welding component designated 150 includes a cylinder 152 soldered or otherwise suitably affixed to a rear flange 154 and an integral movable core 156. A plunge spring 158 is located around the core 156 between the coil 146 and the flange 154. The flange 154 has fittings similar to those of the flange 40 for an air line 160 and a main welding cable 162. The line 160 and the cable 162 extend through openings in the projection 140 along with a control line 164 having conductors for a switch 166 and the coil 146.

The internal component 150 also has a forward enlargement 168 with a portion extending into a groove 170 to maintain the internal component in alignment and prevent rotation thereof. The enlargement 168 is a separate element in this instance and is soldered or otherwise suitably affixed to the cylinder 152. The forward end of the component 150, forwardly of the front wall 144, is connected to chuck means 172, including a chuck adapter 174 and a chuck 176. A plunger 178, a piston rod 180, and a piston 182 are aligned with the chuck means 172 to move a stud to the forward end of the chuck 176 when air is supplied to the cylinder 152. Again, the piston 182 is held in a rear position by a return spring 184.

A spark shield 186 is located around the chuck 176 and is supported by a holder 188. The holder, in turn, is attached to a pair of supporting legs 190 above the chuck means 172, with the legs supported by and extending outwardly from an upper portion of the body 138, on each side of the projection 140. The studs can be fed to the chuck means 172 from a rigid supply tube 192 supported on the legs 190 by a bracket 194. The studs are supplied through a flexible supply line 196 from a suitable supply source, such as is shown in FIG. 1.

All of the lines or tubes, including the air line 160, the welding cable 162, the control line 164, and the supply line 196 can be connected together by a suitable clamp or bracket 198 located in front of a supporting yoke 200. The yoke 200 includes a pair of legs 202 which are pivotally attached to the tool body 138 by fasteners 204 with an upper bar 206 of the yoke attached to a supporting chain or cable 208. With this arrangement, the tool 136 is well balanced and can be pivoted as desired. Also, the various lines and supporting cable require a minimum amount of space and provide minimum obstruction to the welding operation. The tool can be easily operated by the operator with the manually-controlled switch 166 located behind the projection 140 and on top of the body 138.

Various modifications of the above described embodiment of the invention will be aparent to those skilled in the art, it is to be understood that such modifications can be made without departing from the scope of the invention, if they are within the spirit and the tenor of the accompanying claims.

What I claim is:

1. A stud welding tool for welding studs in on-end positions to a workpiece, said tool comprising a body, an electrical lifting coil in a rear portion of said body, said body having a front end wall attached thereto at the end opposite said coil, said end wall having an opening therein, an internal component comprising wall means forming a cylindrical chamber at least partially located in said body and having an end aligned with the end wall opening, said wall means having an outwardly extending flange at a rear portion thereof and a cylindrical projection extending rearwardly beyond said flange, said wall means also having an outwardly extending projection extending outwardly therefrom to cooperate with a groove associated with the tool to prevent rotation of said component, a piston reciprocable in said chamber and having a stud plunger affixed thereto and extending beyond the end wall of said body, said flange having a cable connection at one portion thereof and an air connection at another portion thereof on the other side of said wall means, said component having passage means connecting said chamber and said air line connection, a coil core affixed to the rear end of said component beyond said connections and extending into said coil, a cable electrically attached to said cable connection, said cable having a first portion extending generally parallelly to said component, a U-shaped portion, and a third portion extending outside of said body, an air line connected to said air connection, said air line having a first portion extending generally parallelly to said component, a U-shape portion, and a third portion extending outside said body, chuck means attached to the forward end of said component for receiving and holding a stud during a welding operation, and a plunge spring around said core maintained in compression between said flange and said coil with one end of said spring received around said cylindrical projection.

2. A stud welding tool for welding studs in on-end positions to a workpiece, said tool comprising a body, an electrical lifting coil in a rear portion of said body, said body having a front end wall at the end opposite said coil, said end wall having an opening therein, an internal component for said tool comprising wall means forming a chamber at least partially located in said body and having an end aligned with the wall opening, said wall means having an outwardly extending flange at a rear portion thereof and a rear projection extending beyond said flange, said wall means also having means extending outwardly therefrom to cooperate with a portion of the body of the tool to prevent rotation of said component, a piston reciprocable in said chamber and having a stud plunger affixed thereto and extending beyond the end wall of said body, said wall means having a cable connection at one portion thereof and a fluid connection at another portion thereof on the other side of said wall means, a coil core affixed to the rear end of said component beyond said connections and said rear projection and extending into said coil, a cable electrically attached to said cable connection, said cable having a first portion extending generally parallelly to said component, and a U-shape portion, a fluid line connected to said fluid connection, said fluid line having a first portion extending generally parallelly to said component, and a U-shape portion, chuck means attached to the forward end of said component for receiving and holding a stud during a welding operation, and plunge spring means maintained in compression and urging said component away from said coil.

3. A stud welding tool for welding studs in on-end positions to a workpiece, said tool comprising a body, an electrical lifting coil in a portion of said body, said body having a front end wall, said end wall having an opening therein, an internal component for said tool comprising wall means forming a chamber at least partially located in said body and having an end aligned with the end wall opening, said wall means having an outwardly extending flange at a portion thereof and a rear projection extending beyond said flange, said wall means also having means extending outwardly therefrom to cooperate with a portion of the body of the tool to prevent rotation of said component, a piston reciprocable in said chamber and having a stud plunger affixed thereto and extending beyond the end wall of said body, said wall means having a cable connection at one portion thereof and a fluid connection at another portion thereof, a coil core affixed to the rear end of said component beyond said connections and extending into said coil, a cable electrically attached to said cable connection, a fluid line connected to said fluid connection, said chuck means attached to the forward end of said component for receiving and holding a stud during a welding operation, and plunge spring means maintained in compression and urging said component away from said coil.

4. A stud welding tool for welding studs in on-end positions to a workpiece, said tool comprising a body having a handle, an electrical lifting coil in a rear portion of said body, a core stop at the rear of said coil, a front end wall attached to said body at the end thereof opposite said coil, said end wall having an opening therein, an internal component including a cylinder at least partially in said body and having an end aligned with the end wall opening, said cylinder having a piston reciprocable therein and a stud plunger affixed to said piston and extending beyond the end wall of said body, said component having a cable connection at a rear portion thereof, said component also having a fluid connection at the rear portion thereof, a coil core affixed to the rear end of said cylinder beyond said connections and extending into said coil, a cable electrically attached to said cable connection, said cable having a first portion extending forwardly from said connection, a U-shape portion, and a third portion extending outside of said body through the handle, a fluid line connected to said fluid connection, said fluid line having a first portion extending forwardly, a U-shape portion, and a third portion extending outside said body through the handle, a chuck adapter attached to the forward end of said cylinder, a chuck connected to said chuck adapter outside said body at the forward end thereof, a pair of supporting legs extending forwardly of said body and beyond said end wall, a rigid feed tube attached to said legs and positioned to communicate with said chuck adapter, and means for supplying studs one at a time to said feed tube.

5. A stud welding tool for welding studs in on-end positions to a workpiece, said tool comprising a body, an electrical lifting coil in a rear portion of said body, a core stop at the rear of said coil, said body having a front end wall at the end thereof opposite said coil, said end wall having an opening therein, an internal component including a cylinder at least partially in said body and having an end aligned with the end wall opening, said cylinder having a piston reciprocable therein and a stud plunger affixed to said piston and extending beyond the end wall of said body, said component having a cable connection at a rear portion thereof, said component also having a fluid connection at the rear portion thereof, a coil core affixed to the rear end of said component and extending into said coil, a cable electrically attached to said cable connection, said cable having a first portion extending forwardly from said connection, a U-shape portion, and a third portion extending outside of said body, a fluid line connected to said fluid connection, said fluid line having a first portion extending forwardly, a U-shape portion, and a third portion extending outside said body, chuck means attached to the forward end of said component to receive said stud plunger, and means for supplying studs one at a time to said chuck means.

6. A stud welding tool for welding studs in on-end positions to a workpiece, said tool comprising a body forming a chamber, an internal component including a cylinder mostly within said chamber and having an end extending forwardly thereof, said cylinder having a piston reciprocable therein and a stud plunger affixed to said piston, said component having a cable connection and a fluid connection, a cable electrically attached to said cable connection, said cable having a first portion extending generally parallel to said component from said cable connection, a U-shape portion, and a third portion extending outside of said body, a flexible line connected to said fluid connection, said flexible line having a first portion extending generally parallel to said component from said fluid connection, a U-shape portion, and a third portion extending outside said body, the front portion of said component being adapted to receive chuck means which holds studs, one at a time, during a welding operation.

7. A stud welding tool for welding studs in on-end positions to a workpiece, said tool comprising a body having a handle, an electrical lifting coil in a rear portion of said body, a core stop at the rear of said coil, a front end wall attached to said body at the end thereof opposite said coil, said end wall having an opening therein, an internal component including a cylinder at least partially in said body and having an end aligned with the end wall opening, said cylinder having a piston reciprocable therein and a stud plunger affixed to said piston and extending beyond the end wall of said body, said component having a cable connection at a rear portion thereof, said component also having a fluid connection at the rear portion thereof, a coil core affixed to the rear end of said cylinder beyond said connections and extending into said coil, a cable electrically attached to said cable connection, a fluid line connected to said fluid connection, a chuck adapter attached to the forward end of said cylinder, a chuck connected to said chuck adapter outside said body at the forward end thereof, a pair of supporting legs extending forwardly of said body and beyond said end wall, a rigid feed tube attached to said legs and positioned to communicate with said chuck adapter, and means for supplying studs one at a time to said feed tube.

8. A stud welding tool for welding studs in on-end positions to a workpiece, said tool comprising a body, an electrical lifting coil in a rear portion of said body, a core stop at the rear of said coil, said body having a front end wall at the end thereof opposite said coil, said end wall having an opening therein, an internal component including a cylinder at least partially in said body and having an end aligned with the end wall opening, said cylinder having a piston reciprocable therein and a stud plunger affixed to said piston and extending beyond the end wall of said body, said component having a cable connection at a rear portion thereof, said component also having a fluid connection at the rear portion thereof, a coil core affixed to the rear end of said component and extending into said coil, a cable electrically attached to said cable connection, a fluid line connected to said fluid connection, chuck means attached to the forward end of said component to receive said stud, and means for supplying studs one at a time to said chuck means.

9. A stud welding tool for welding studs in on-end positions to a workpiece, said tool comprising a body forming a chamber, an electrical coil in a rear portion of said chamber, an internal component including a cylinder mostly within said chamber and having an end extending forwardly thereof, said cylinder having a piston reciprocable therein and a stud plunger affixed to said piston, said component having a cable connection and a fluid connection, a coil core affixed to the rear end of said component beyond said cable connection and extending into said coil, a cable electrically attached to said cable connection, a flexible line connected to said fluid connection, the front portion of said component being adapted to receive chuck means which holds studs, one at a time, during a welding operation.

10. A stud welding tool for welding studs in on-end positions to a workpiece, said tool comprising a body forming a chamber, an electrical coil in a rear portion of said chamber, an internal component including a cylinder mostly within said chamber and having an end extending forwardly thereof, said cylinder having a piston reciprocable therein, an outwardly extending flange at the rear of said cylinder, said flange having a cable connection and a fluid connection at spaced portions thereof, a coil core affixed to the rear end of said component beyond said flange and extending into said coil, a coiled plunge spring mounted in compression around said core between said coil and said flange, the front portion of said component being adapted to receive chuck means for holding studs during a welding operation.

11. A stud welding tool for welding studs in on-end positions to a workpiece, said tool comprising a body forming a chamber, an electrical coil in a rear portion of said chamber, an internal component including a cylinder mostly within said chamber and having an end extending forwardly thereof, said cylinder having a piston reciprocable therein, said component having a cable connection and a fluid connection at spaced portions thereof, a coil core affixed to the rear end of said component and extending into said coil, a coiled plunge spring mounted in compression around said core between said coil and a portion of said component, the front portion of said component being adapted to receive chuck means for holding studs during a welding operation.

12. An internal component for a stud welding tool comprising wall means forming a cylindrical chamber and having an outwardly extending flange at a rear portion thereof and a cylindrical projection extending rearwardly beyond said flange to receive an end of a plunge spring seated against said flange, said wall means also forming an outwardly extending ridge extending longitudinally of said cylindrical chamber to cooperate with a groove in the body of the tool to prevent rotation of said component, said flange having means to receive a welding cable at one portion thereof and means to receive a fluid line at another portion thereof, said component having a fluid passage connecting said fluid line receiving means with a rear portion of said cylindrical chamber, and a piston in said cylindrical chamber and a piston rod connected to said plunger and extending forwardly through said chamber, said component having means at one end for making a connection with a coil core and means at the other end for making a connection with chuck means for holding a stud during a welding operation.

13. An internal component for a stud welding tool, the tool comprising wall means forming a cylindrical chamber, a plunge spring in a rear portion of said chamber, and a solenoid coil adjacent said plunge spring, said internal component forming a piston chamber and having transversely outwardly-extending means on a rear portion thereof and a coil core projection extending rearwardly of said outwardly-extending means for receiving an end of the plunge spring and adapted to extend into the solenoid coil, said internal component also forming means at a portion spaced forwardly of said outwardly-extending means and adapted to cooperate with a portion of the wall means of the tool to prevent rotation of said component, said component further having means to carry a welding cable at one portion thereof and means to carry a fluid line at another portion thereof, said component having a fluid passage connecting said fluid line carrying means with a rear portion of said piston chamber, and a piston in said piston chamber having a piston rod extending forwardly through said chamber and beyond the forward portion of said internal component.

14. A hand-operated, portable stud welding tool comprising a body forming a chamber having a forward opening, an electrical coil in a rear portion of said chamber, a plunge spring adjacent said coil, an internal component located at least partly within said chamber and aligned with said forward opening, said component comprising wall means forming a piston chamber and a coil core extending rearwardly of said piston chamber and into said coil, said wall means also forming means cooperating with a portion of said tool body adjacent said chamber to prevent rotation of said internal component relative to said body, said component further having means to carry a welding cable at a portion thereof and means to carry a fluid line at another portion thereof, said component having a fluid passage connecting said fluid line carrying means with a portion of said piston chamber, a piston in said piston chamber, a piston rod connected to said piston and extending forwardly through said piston chamber and forwardly of tool body, and stud chuck means connected to said component forwardly of said tool body and aligned with said piston rod.

15. A hand-operated, portable, stud welding tool comprising a body forming a main chamber and forming a forward opening communicating with said chamber, means in said chamber for retracting a stud to be welded by the tool, means in said chamber for plunging the stud toward a workpiece during a welding cycle, an internal component for said tool, at least a substantial portion of said component being within said chamber and aligned with said forward opening, said internal component forming a piston chamber and further having means cooperating with said retracting means and means cooperating with said plunge means for moving said component longitudinally relative to said body, said component further having means for carrying a welding cable at one portion thereof and means for carrying a fluid line for supplying fluid at least to a rear portion of said piston chamber, a piston in said piston chamber, a piston rod connected to said piston and extending forwardly through said main chamber and beyond a forward end thereof, means forming a stud loading chamber affixed to the forward end of said component, and a stud chuck affixed to a forward end of said loading chamber means, said chuck and said chamber being aligned with said piston rod.

References Cited

UNITED STATES PATENTS 2,537,989   1/1951   Graham _____ 219—78

JOSEPH V. TRUHE, Primary Examiner

R. F. STAUBLY, Assistant Examiner

U.S. Cl. X.R.

219—103